United States Patent [19]
Crawford

[11] Patent Number: 5,796,783
[45] Date of Patent: Aug. 18, 1998

[54] DIGITAL TRANSMISSION SYSTEM

[75] Inventor: James A. Crawford, San Diego, Calif.

[73] Assignee: Andre Alain Tabourian, San Diego, Calif.

[21] Appl. No.: 550,857

[22] Filed: Oct. 31, 1995

[51] Int. Cl.$^6$ .................................................. H04L 27/09
[52] U.S. Cl. ......................... 375/298; 375/295; 332/103; 455/23; 455/42
[58] Field of Search ........................... 375/295, 298, 375/200, 219; 332/103, 104, 108, 117, 119, 143; 455/23, 42; 371/295, 298

[56] References Cited

U.S. PATENT DOCUMENTS

| | | | |
|---|---|---|---|
| 5,222,103 | 6/1993 | Gross | 332/103 |
| 5,251,232 | 10/1993 | Nonami | 332/117 |

*Primary Examiner*—Wellington Chin
*Assistant Examiner*—Congvan Tran
*Attorney, Agent, or Firm*—William Patrick Waters

[57] ABSTRACT

A waveform generating system generates one or more quadrature amplitude modulated (QAM) spectrum pairs which are combined with a frequency modulated (FM) spectrum in the center. The QAM spectrums are offset in frequency to result in a gap in the center to allow combining of the FM spectrum without interference.

1 Claim, 5 Drawing Sheets

DIGITAL TRANSMISSION SYSTEM

TECHNICAL FIELD

This invention relates to signal modulation in general and particularly to a technique for digital signal transmission which enables compatibility with analog receivers.

BACKGROUND ART

Digital communication is increasingly becoming the preferred method of transmitting information in wireless communication systems. Early communication systems were intended primarily for voice communication, and thus used analog modulation schemes. Frequency modulation was a common choice because it provided good voice quality, but at the expense of using a large transmission bandwidth. As data communication was required along with voice transmission, analog modulation was used to modulate the digital data signals. The major portion of the frequency spectrum was still occupied by the analog voice portion of the modulated signal. The digital data was for auxiliary purposes. Since the digital signal was a small portion of the total bandwidth the use of an efficient modulation method was not critical.

Communication systems intended for voice transmission can be used to transmit exclusively digital information. This is done by using the existing radio frequency modulation method with an appropriate baseband modulator/demodulator (MODEM). The data rate possible with this arrangement is limited because of the inefficient analog RF modulation method used.

Presently, the primary requirement for many communication channels is to transmit digital data. In order to achieve the needed bandwidth efficiency for digital data, modulation schemes optimized for digital data must be used. Adapting analog modulation schemes will not provide the needed bandwidth efficiency.

Existing analog radio frequency channel assignments are evolving to meet the new digital communication needs. Given the use of older generation analog radio transceivers and newer digital transceivers on the same frequency bands, there is the need to maintain some compatibility to insure that the systems are interoperable.

One example system is the specialized mobile radio system. A specialized mobile radio (SMR) system is a licensed base/mobile relay facility in which a single conventional channel or a group of trunked channels is operated to allow mobile users to communicate for such uses as public safety or industrial and land transportation. Individuals or the government may be licensed to use an SMR system. SMR systems are primarily used for voice communication but can also be used for data communication by use of an appropriate data MODEM.

The SMR system uses a network of repeater base stations and mobile transceivers. Mobile transceiver units communicate to other mobile units through the repeaters. Each SMR system may use up to 20 trunked channels. A control feature facilitates the assignment of channels to individual users seeking to communicate. This process is handled by communication of system control messages between the mobile units and the repeaters. The assignment to a frequency channel is transparent to the user. One repeater is required for each channel in the system and repeaters are co-located and connected together over a data bus to exchange information for network management.

A users mobile radio unit gains access to the system by monitoring messages sent by a home repeater assigned to the mobile unit. The messages contain data to indicate which channels are available for use and identifying information regarding both the mobile unit and the repeater.

A frequency band in the 800 and 900 MHz regions of the electromagnetic spectrum is allocated by the FCC for land mobile use. In the frequency range of 806 to 809.75 MHz, 150 conventional channels with a spacing of 25 KHz are assigned for mobile transmissions to repeaters. A corresponding band 45 MHz higher at 851 to 854.75 MHz is used for repeater transmission to mobiles. Additional channels are assigned to the frequency range of 809.75 to 821 MHz and 854 to 866 MHz providing for 450 conventional and trunked channels.

Present SMR systems use frequency modulation to modulate a carrier with the baseband voice signal. Data signaling of the system control messages is done using subaudible frequencies below 150 Hz and is continuously transmitted even when voice modulation is present. This low frequency data signaling method is used to avoid the use of separate control channels. The frequency spectrum is illustrated in FIG. 4. Data is transmitted in 40 bit messages at a rate of 300 bits per second.

Several modulation schemes are well known, including frequency modulation (FM), frequency shift keying (FSK), phase modulation (PM), amplitude modulation (AM), quadrature amplitude modulation (QAM), phase shift keying (PSK), minimum shift keying (MSK), and quadrature phase shift keying (QPSK). Digital systems frequently use QAM, PSK, or QPSK because these modulation schemes offer higher bandwidth efficiency than FM or AM for digital data.

Frequency shift keying is a form of frequency modulation where the frequency change of the carrier is rapid between two discrete frequencies. QAM and QPSK are forms of double sideband suppressed carrier amplitude modulation which use an in-phase and quadrature-phase carrier, each of which is modulated by an independent modulating signal, then combined to form a resulting waveform. The advantage of quadrature modulation is that higher bandwidth efficiency is achieved because two modulated carriers are transmitted over the same frequency band. A QPSK signal has two discrete phases for each carrier component, representing one bit of information, and thus transmits two bits per symbol. A QAM signal will have four or more discrete amplitude levels modulated onto the carriers. Thus four or more bits of information are transmitted in each symbol. A 16QAM signal has four levels on each of two carriers yielding 16 combinations and will represent 4 bits of information in each symbol.

Composite modulated waveforms are used and known. One example is disclosed in U.S. Pat. No. 4,816,783 which combines two QAM sidebands spaced far enough apart in frequency to result in a space where an AM signal is inserted in the center. In this modulator, the center carrier is modulated to provide bit synchronization and pilot signals for use in demodulating the QAM sidebands. This system is not backward compatible with analog systems because no control channel information is present.

It is known to use QAM for transmitting the user digital data over an RF link while frequency modulating the QAM carrier for the transmission of control information used to operate the link. The FM control signal is independent of the QAM digital data. The carrier tracking loop of the QAM demodulator at the receiving end of the link must have sufficiently high bandwidth to track out the FM in the carrier to avoid impairing the QAM demodulation process.

The carrier tracking loop can at the same time demodulate the FM carrier to extract the control signal. This system will not work to provide backward compatibility with an analog system because the analog systems are attempting to perform a FM demodulation process on the entire signal. The presence of the QAM signal appears as significant noise at the zero crossings of the waveform. The FM control channel signal is degraded as the frequency discriminator demodulates this noise along with the FM control channel.

A signal transmitted over a wireless link will experience impairment due to reflections off of natural and artificial objects. Such a multipath condition will cause time dispersion of the transmitted signal and result in intersymbol interference (ISI). At higher symbol rates, with shorter symbol periods, the waveform is more susceptible to time dispersion as the delay spread is a higher proportion of the total symbol period, thereby resulting in severe selective fading.

One solution to this problem is to adaptively equalize the received signal to correct the ISI. This approach requires significant processing of the signal, which is costly in power consumption and circuitry. Additionally, the equalization requires time to adapt to the changing signal conditions which increases the requirements of an equalizer used in a mobile radio system.

Another approach to solving the time dispersion problem is to transmit at a lower symbol rate. This increases the symbol period and thus lowers the effect of a given delay spread. To compensate for the lower data rate offered by a lower symbol rate, multiple signals are transmitted with each communicating a portion of the users data. To achieve lower symbol rates at the same user data rate, several independent low symbol rate signals are transmitted simultaneously. At lower symbol rates the stability must be better for oscillators used to modulate and demodulate. The effects of Doppler fading becomes more pronounced also. The oscillator stability, Doppler fading, and the increased complexity of multiple signals puts an effective limit on the symbol rate reduction.

A digital mobile radio system employing multi-channel 16QAM has been proposed. (A 64 KBPS digital land mobile radio system employing M-16QAM , Birchler ICWC 1992) In this system, the information source is split into four parallel data streams which are each mapped into 16QAM symbols. The four symbol streams are filtered and modulated onto separate adjacent subcarriers, then combined. The spectrum of the combined waveform occupies a single radio channel of 25 KHz. Since the entire spectrum is used to transmit the four 16QAM signals, no compatibility is offered for analog radios using an FM control channel for frequency assignment and network control.

It is desirable to transmit digital information on a radio channel. In a system that uses analog FM radios and digital radios, the process of assigning frequency channels must operate with both types of radios. When digital radios are introduced into an existing system it is desirable not to have to replace the analog FM radios. Achieving this result requires that the digital modulation provide for compatibility with the subaudible data signaling described above. The problem in achieving this compatibility is that most digital modulation schemes occupy the entire frequency band of the channel used. A new modulation scheme is therefore required.

In view of the foregoing, it would be desirable to have a technique for transmitting digital information and compatible control channel information in an effective and efficient manner.

DISCLOSURE OF THE INVENTION

In a radio communication system using quadrature amplitude modulation for transmission of digital data it is desirable to maintain compatibility with older analog radios. It is therefore desirable to transmit the frequency modulated signal component expected by the older radios along with the quadrature amplitude modulated digital signal used by the new radios.

It is an object of the invention to provide a method and apparatus for generating a waveform for transmitting digital information over radio systems.

It is another object of the invention to provide a method and apparatus for generating a modulated waveform which contains both FM and QAM components.

It is another object of the invention to provide a method and apparatus of generating a modulated waveform for transmitting digital information over radio systems in which the frequency assignment control portion for the spectrum is compatible with analog FM radio transceivers not employing digital reception.

It is another object of the invention to provide a digital radio transceiver that is compatible with analog transceivers and repeaters operating on the same network.

It is another object of the invention to provide an improved radio communication system in which transceivers communicating digital information are used along with transceivers communicating voice information.

Briefly, the above and further objects of the present invention are realized by providing a modulation method and system in which a carrier is frequency modulated by a low rate digital control channel, a user digital information source is split into two or more parallel low-rate data streams each of which is mapped into QAM symbols, each QAM symbol stream is modulated onto a separate subcarrier, the FM carrier is combined with the QAM subcarriers into a composite signal, the composite signal is up-converted to a specific RF channel and transmitted. The QAM subcarriers are symmetrically spaced about the FM carrier far enough apart so that the modulated QAM signal does not interfere with the modulated FM signal in the center. Two or more QAM components can be used to achieve the optimum symbol rate to minimize the channel impairments caused at high rates and other effects caused at low rates. As an alternative to QAM, the modulation of the data streams could be QPSK or other digital modulation waveform.

The present invention provides several distinct advantages. The waveform generated in accordance with this invention will be compatible with the-sub-audible control channel of standard analog FM radios and repeaters in that the frequency demodulation process in the receiver of these radios will properly demodulate the control channel signal and ignore the QAM digital signal. The digital receivers will demodulate the digital data while using the FM control channel in the same manner as the analog receivers. The present invention utilizes a bandwidth efficient modulation scheme to transmit digital user information with minimal impairment due to the radio frequency channel conditions.

The foregoing and other objects, aspects, and advantages, as well as the novel features of both the structure and operation of the present invention will be understood from the following detailed description of the invention when taken in conjunction with the accompanying drawings.

DETAILED DESCRIPTION OF THE INVENTION AND BEST MODE FOR CARRYING OUT THE INVENTION

Conventional digital modulation such as FSK, QPSK, and QAM techniques result in a frequency spectrum that occupies the entire radio channel allocated for communication, for example 25 KHz. To achieve compatibility with analog FM transceivers, the subaudible data signaling used for frequency assignment must be transmitted and received by the digital transceivers, while at the same time transmitting and receiving digital information. Also the modulation scheme used for the digital information must be bandwidth efficient.

Analog FM transceivers contain a transmitter section and receiver section. The transmitter section combines the audible voice signal with the subaudible data signal and frequency modulates a carrier. The receiver section separates the demodulated FM signal into an audible voice component and the subaudible data signaling component.

The present invention generates a QAM digital signal that occupies the frequency band which would be occupied by the voice signal, and generates an FM signal that occupies the same frequency band as occupied by the subaudible data signal. Both a digital transceiver and an analog FM transceiver will be able to utilize the signaling data for frequency assignment.

Figure 5:
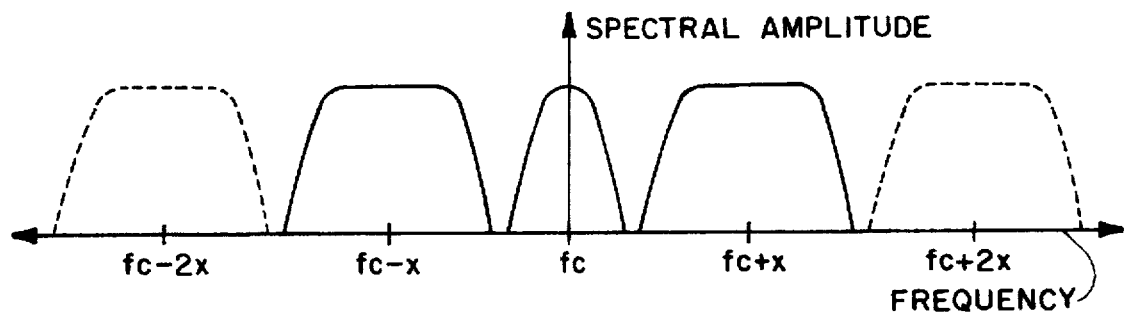
FIG. 5 is a graphical representation of the frequency spectrum of the modulated signal with a frequency modulated carrier in the center and quadrature modulated sidebands, in accordance with the present invention.

FIG. 5 shows a spectrum which contains frequency modulated information in the center of two or more QAM spectrums. This signal is transmitted by a digital transceiver using the present invention. The FM signal contains the signaling data which will be received and processed by the analog FM transceivers and is indistinguishable from the signaling data transmitted by an analog FM transceiver, thus compatibility is achieved.

Figure 1:
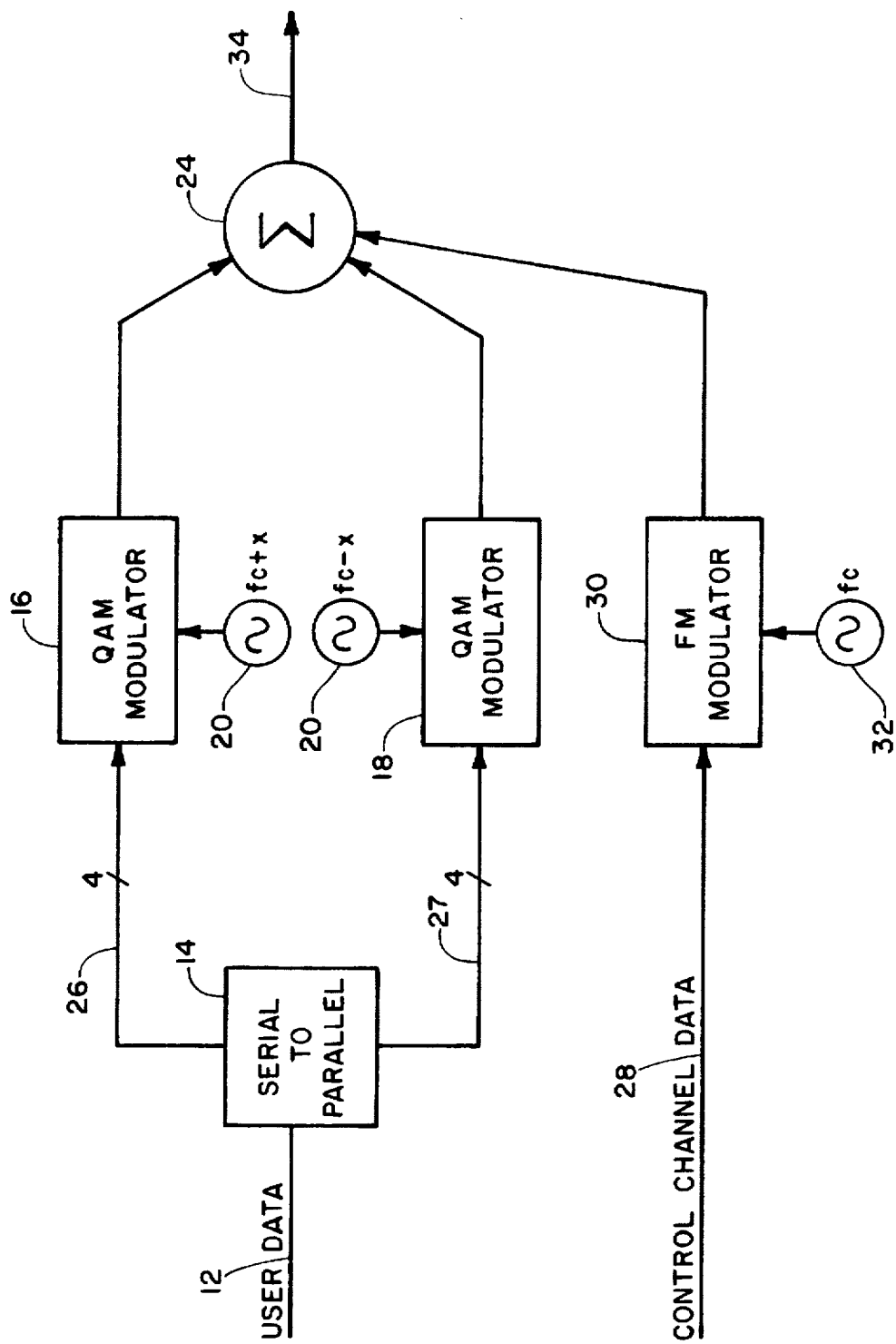
FIG. 1 is a block diagram of a modulator in accordance with the present invention.
Figure 2:
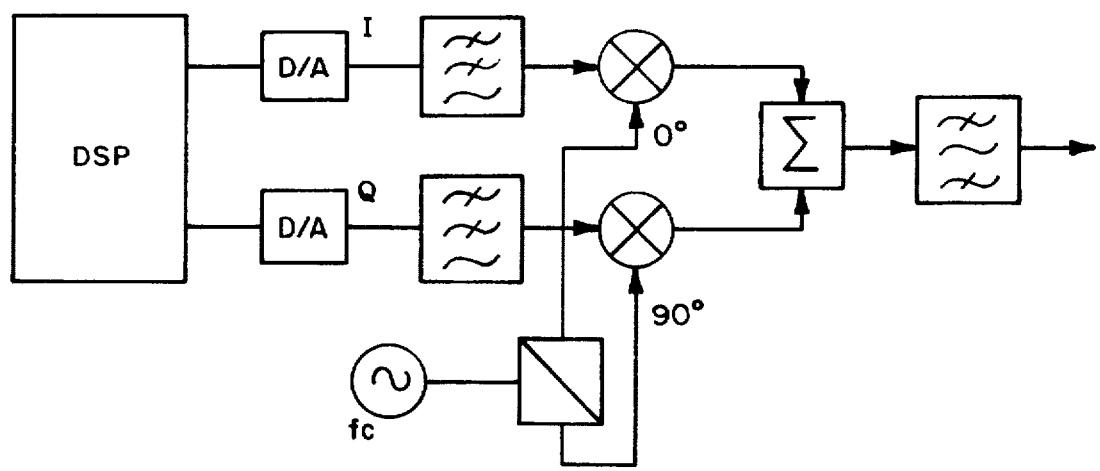
FIG. 2 is a block diagram of the preferred embodiment of a modulator in accordance with the present invention.
Figure 3:
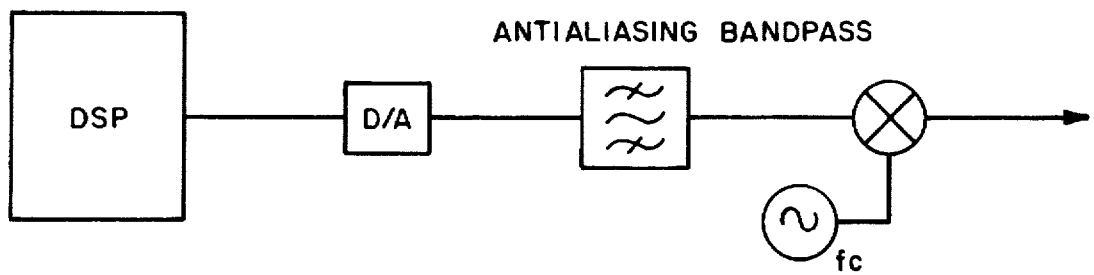
FIG. 3 is a block diagram of another embodiment of a modulator in accordance with the present invention.
Figure 4:
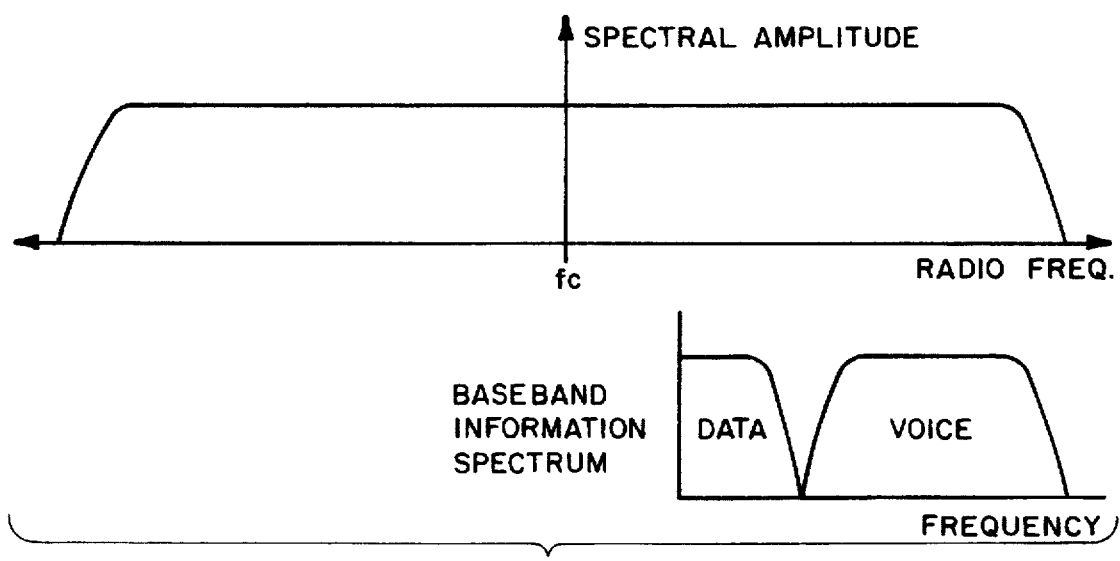
FIG. 4 is a graphical representation of the frequency spectrum of the baseband and analog frequency modulated SMR signal.

Referring to FIG. 1, there is shown a new modulator in accordance with the present invention. The modulator receives a serial data stream 12 which contains information according to the user requirements. Serial to parallel converter 14 splits the serial data into two separate parallel data paths of four bits each. The serial to parallel conversion is performed by first latching four consecutive bits of the serial data into a register for the upper data path 26, then latching the next four consecutive bits into a register for the lower data path 27. The latching process continues repetitively latching alternating groups of four bits into the upper and lower data paths. The four bit parallel data paths are input to respective QAM modulators 16 and 18. Both QAM modulators operate in the same manner using different local oscillator frequencies.

Figure 6A:
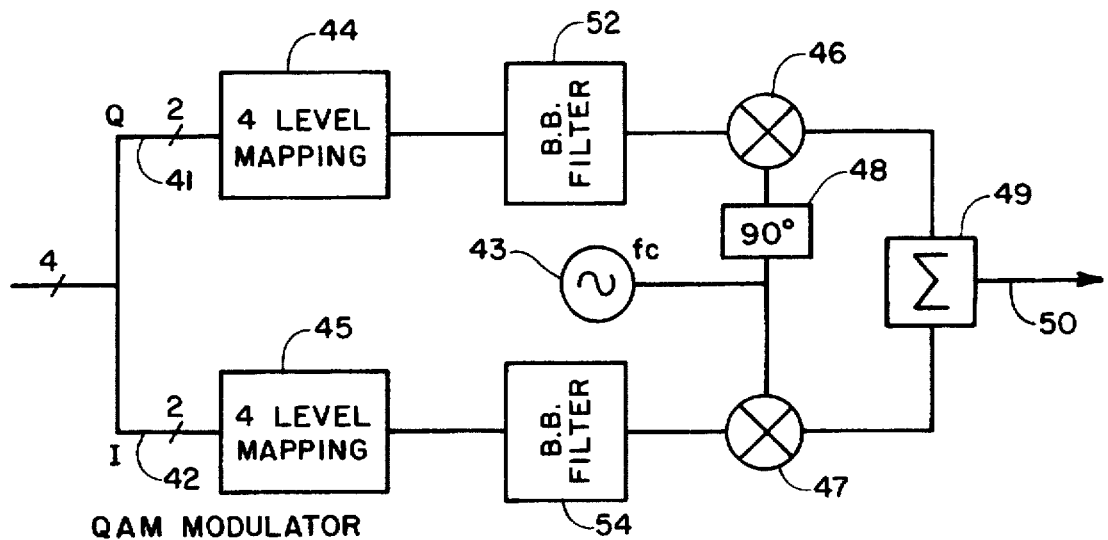
FIG. 6 is a block diagram of a QPSK modulator and 16QAM modulator.
Figure 6B:
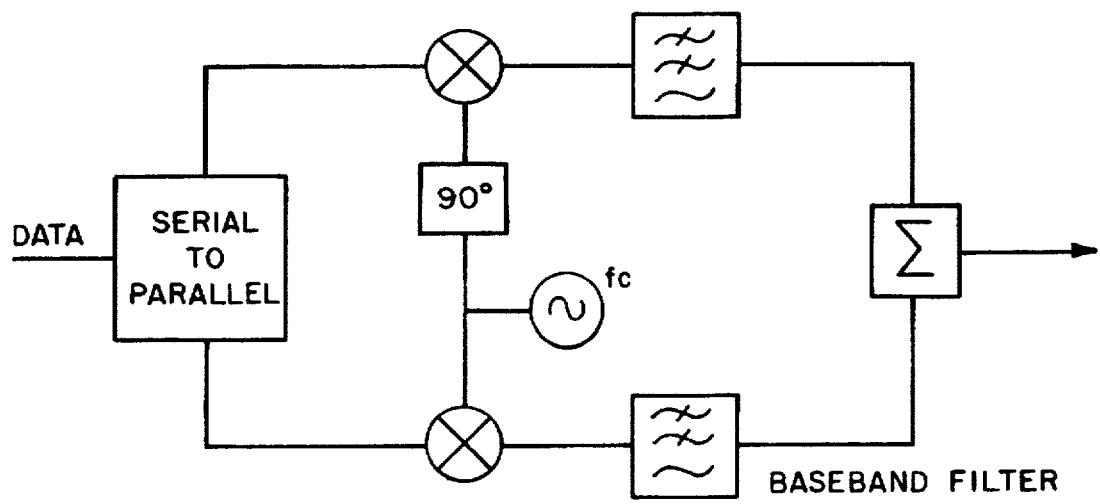

Referring to FIG. 6A, inside the QAM modulators the four bits are partitioned into an in-phase (I) 42 and quadrature-phase (Q) 41 data signal of two bits each. Each two bit signal is mapped into a four level signal by symbol mapping functions 44 and 45. The mapping functions map specific bit patterns to predetermined uniformly spaced amplitude levels. For example:

| Binary Sequence | Relative Level |
| --- | --- |
| 1,1 | +3 |
| 1,0 | +1 |
| 0,1 | −1 |
| 0,0 | −3 |

The symbol mapping creates baseband symbols which are filtered by baseband waveshaping filters 52 and 54 then input to the baseband port of frequency mixers 46 and 47. Waveshaping filters 52 and 54 create the desired pulse shape and determine the spectral shape of the QAM modulated signal. The local oscillator port of the mixers are fed by an in-phase and quadrature-phase local oscillator signal. The quadrature-phase signal is created by a phase shifter 48 from the in-phase local oscillator. Alternatively, a phase shifter can receive a local oscillator signal and generate in-phase and quadrature-phase signal outputs. Mixer outputs are summed by summer 49 to result in a double sideband suppressed carrier (DSBSC) intermediate frequency (IF) signal.

Figure 8:
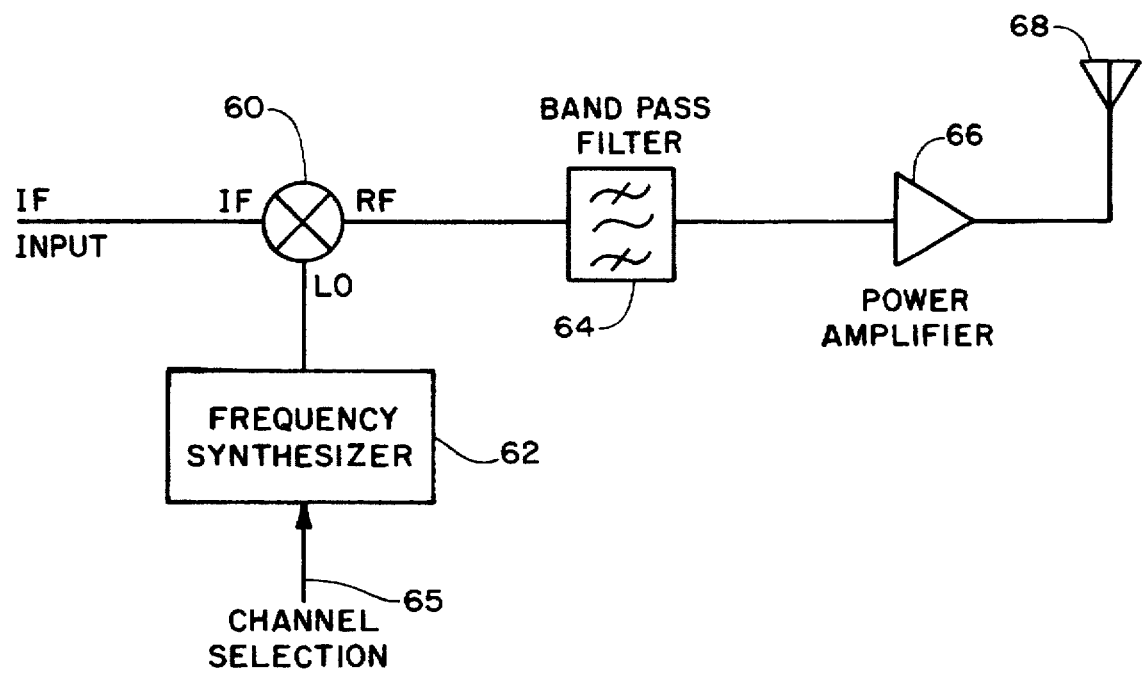
FIG. 8 is a block diagram of an upconverter.

Referring again to FIG. 1, control channel data 28 is frequency modulated by a standard frequency modulator 30. The outputs from QAM modulators 16 and 18 and the output of frequency modulator 30 are summed in summer 24 to result in the IF composite modulated signal 34. Referring to FIG. 8, The IF signal is frequency translated to the RF channel designated for communication. Frequency synthesizer 62 outputs an L.O. signal in response to channel selection signal 63 which can be a digital control signal from a microprocessor control unit within the radio transceiver. The output of mixer 60 is bandpass filtered to remove the unwanted mixing terms then amplified by power amplifier 66 and fed to an antenna 68.

QAM modulator 16 uses a local oscillator frequency of Fc+X and QAM modulator uses an-L.O. frequency of Fc−X. Fc is the carrier frequency in the center of the occupied frequency band. Referring to FIG. 5, frequency offset X is selected so that the modulated DSBSC signal from each 16QAM modulator is separated from the center frequency far enough to avoid overlapping the FM signal in the center. Frequency modulator 30 uses an L.O. of Fc.

By way of example, a serial data stream of 48 kbps can be split into two data paths of four bits each at a rate of 6 kwords per second. Since each four bit word generates one symbol, the symbol rate after symbol mapping will be 6 ksps. If baseband waveshaping filter is a square-root raised cosine filter with excess bandwidth parameter of 0.25 the modulated bandwidth out of the QAM modulator will be 7.5kHz. For a control channel data rate of 300 bps the modulation rate will be 150 Hz. Using Carson's rule for estimating frequency modulation, with a frequency deviation of 1 kHz and a modulation rate of 150 the FM bandwidth will be 2300Hz centered around Fc. For design margin the occupied bandwidth is assumed to be 2500 Hz. A frequency offset X is selected to be 7.5 kHz/2 +2.5 kHz/2 or 5 kHz. With this offset value the QAM signals will not overlap with the FM signal.

The invention can be realized by using a digital signal processor (DSP) to perform the calculations necessary for modulating and combining signals.

In one embodiment of the DSP computes I and Q sample sequences which are output to a digital to analog (D/A) converter. The D/A outputs are filtered by lowpass filters to remove the sampling clock component and result in continuous time waveforms. These waveforms are frequency translated by a DSBSC modulator to an intermediate frequency.

In another embodiment of the invention, bandpass reconstruction techniques are used where all computations are performed in a digital signal processor (DSP) then a discrete time sequence is output from the DSP to a D/A converter. The analog output from the D/A is filtered by a bandpass filter to remove the sampling clock component to result in a continuous time waveform. This waveform is frequency translated to the proper radio frequency (RF) by a conventional mixing operation. The RF signal is amplified by a power amplifier (PA) and fed to the antenna.

Figure 7B:
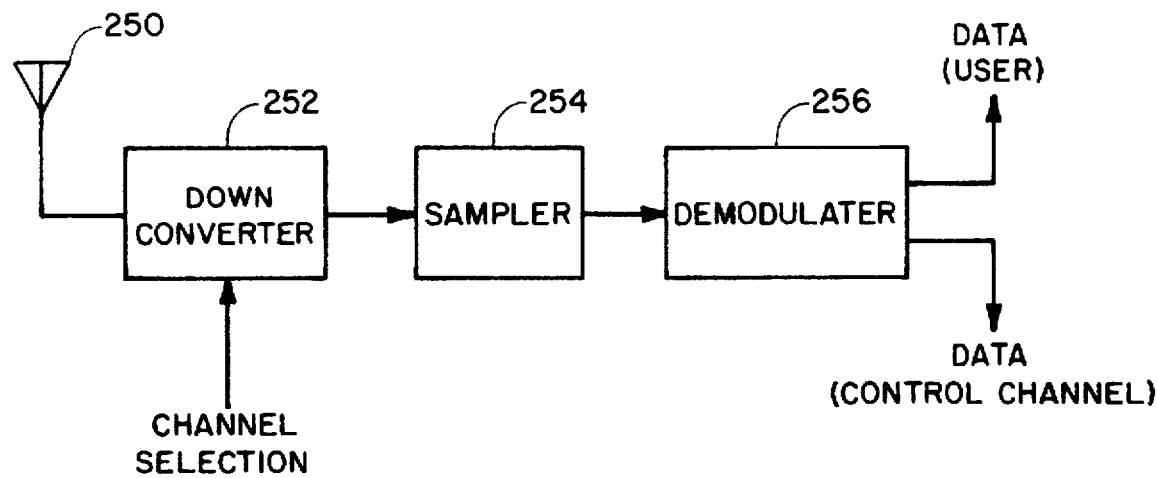
FIG. 7 is a block diagram of a demodulator and receiver in accordance with the present invention.
Figure 7A:
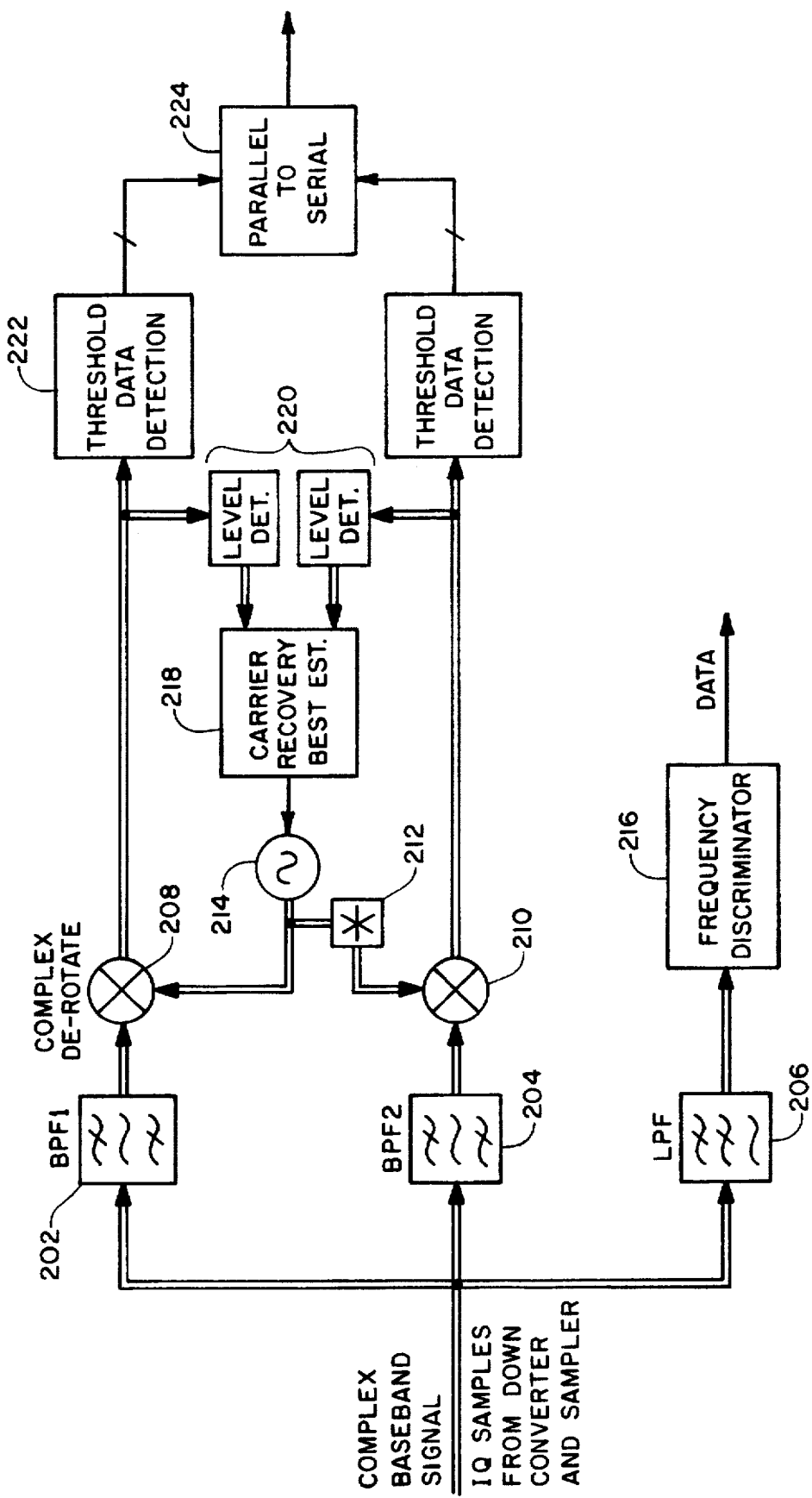

Referring to FIG. 7, a demodulator is shown capable of demodulating the modulated waveform generated in accordance with the present invention. After being received by antenna 250 and downconverted to baseband frequency, the signal is converted to a sequence of complex samples by sampler 254. The sample sequence is represented by I samples and Q samples which preserve all phase and frequency information. The sample rate is sufficiently above the Nyquist frequency to prevent aliasing and allow implementation with realizable filters. An alternative to converting the received signal to baseband frequency is to downcovert to an I.F. frequency, downconverter 252 then bandpass sample the I.F. signal with sampler 254. Either baseband or bandpass sampling techniques will result in a discrete time sequence of samples representing the signal of interest which is suitable for further processing to demodulate the signal.

The complex signal samples are routed to three filters. Bandpass filter 202 is centered on the upper QAM sideband signal, passing the upper sideband and rejecting all other frequencies. Bandpass filter 204 is centered on the lower QAM sideband and passes that component of the signal. Lowpass filter 206 filters out the FM signal in the center of the band.

The output of lowpass filter 206 drives a frequency discriminator 216 which performs frequency demodulation of the FM signal.

The output from bandpass filters 202 and 204 representing the upper and lower QAM sideband signals are processed to de-rotate the carrier signal, provide matched filtering, and threshold detect the data. Complex de-rotator 208 and 210 frequency translate the upper and lower sideband carrier frequency output of bandpass filters 202 and 204 to zero frequency offset by a mixing operation. This de-rotation results in baseband I and Q signals. The L.O. for the de-rotators is generated by frequency generator 214 and is used directly for de-rotating the upper sideband. Since the upper and lower sidebands are symmetrical around a center frequency, the upper sideband has the same frequency offset as the lower sideband with difference in sign. A complex conjugate operation performed on the output of frequency generator 214 results in a signal that is used for the lower sideband de-rotator. The outputs of the de-rotators are the I and Q baseband signals with four amplitude levels. Data detection 222 is performed by comparing the level in each symbol against thresholds to determine the level represented. This is the reverse process of the symbol mapping done in the transmitter. Two bits of information are represented by the four possible levels. The output from the data detectors is combined by parallel to serial converter 224.

The tracking of the carrier signal in the sidebands is done using Costas-loop type demodulation which performs cross multiply of the I and Q baseband signal components after de-rotation. This generates an error signal which drives the phase and frequency of the frequency generator 214. Level detectors 220 examines the level of the upper and lower sidebands. By weighting the measured carrier error from each sideband with the respective signal level detected, the best estimate available is used. In this way the demodulator can operate with fading effecting one sideband only.

What is claimed is:

1. A method for generating a composite modulated signal comprising the steps of:

quadrature modulating a first signal and a second signal onto a first carrier to result in a first modulated carrier;

quadrature modulating a third signal and a fourth signal onto a second carrier to result in a second modulated carrier;

frequency modulating a fifth signal onto a third carrier to result in a third modulated carrier;

combining said first modulated carrier with said second modulated carrier and with said third modulated carrier to result in a composite modulated signal wherein said first carrier and said second carrier are separated in frequency by a predetermined amount and said third carrier is in the center of said first carrier and said second carrier.

* * * * *